US008631338B2

(12) United States Patent
Sen et al.

(10) Patent No.: US 8,631,338 B2
(45) Date of Patent: Jan. 14, 2014

(54) GENERATING UNIVERSAL GRAPHICAL USER INTERFACE ELEMENT AND RELATION

(75) Inventors: Sreerupa Sen, Bangalore (IN); Sandeep Kohli, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 1366 days.

(21) Appl. No.: 12/189,164

(22) Filed: Aug. 10, 2008

(65) Prior Publication Data
US 2010/0037155 A1 Feb. 11, 2010

(51) Int. Cl.
*G06F 3/048* (2013.01)

(52) U.S. Cl.
USPC .......................... 715/763; 715/762; 715/765

(58) Field of Classification Search
USPC .......................... 715/762, 763, 765
See application file for complete search history.

(56) References Cited

U.S. PATENT DOCUMENTS

| | | | |
|---|---|---|---|
| 5,802,514 A | 9/1998 | Huber | |
| 6,044,380 A | 3/2000 | Gerard et al. | |
| 6,192,371 B1 | 2/2001 | Schultz | |
| 6,259,448 B1 | 7/2001 | McNally et al. | |
| 6,335,741 B1 | 1/2002 | Nock | |
| 6,738,077 B1 | 5/2004 | Wendker et al. | |
| 7,350,190 B2 | 3/2008 | Torres et al. | |
| 7,363,578 B2 | 4/2008 | Bendsen et al. | |
| 7,890,877 B2 * | 2/2011 | Ritchy et al. | 715/762 |
| 2003/0101412 A1 * | 5/2003 | Eid | 715/513 |
| 2004/0230946 A1 | 11/2004 | Makowski et al. | |
| 2005/0010901 A1 | 1/2005 | Udler | |
| 2005/0066280 A1 | 3/2005 | Austin et al. | |
| 2005/0066285 A1 * | 3/2005 | Santori et al. | 715/763 |
| 2005/0160401 A1 | 7/2005 | Russo et al. | |
| 2006/0093309 A1 * | 5/2006 | Herberger et al. | 386/46 |
| 2006/0129976 A1 | 6/2006 | Brand et al. | |
| 2007/0209022 A1 | 9/2007 | Gourdol et al. | |
| 2008/0034128 A1 | 2/2008 | Evans | |
| 2008/0059504 A1 * | 3/2008 | Barbetta et al. | 707/102 |
| 2008/0256466 A1 * | 10/2008 | Salvador et al. | 715/762 |

OTHER PUBLICATIONS

Michelle Kislink, "Morphing Object, Process, and Person During Two Decades of Research with Musical Life in Centrafrique", www.sibetrans.com; pp. 1-6.

(Continued)

*Primary Examiner* — Omar Abdul-Ali
(74) *Attorney, Agent, or Firm* — Cuenot, Forsythe & Kim, LLC

(57) ABSTRACT

A method, system and article of manufacture are disclosed for creating a graphical user interface (GUI) item, in a computer system having a graphical user interface and a display screen. The method includes the step of enabling a user to create one or more instances of a defined GUI item. This enabling step, in turn, includes the steps of displaying on the display screen a Universal Graphical User Interface (UGUI) item; and identifying on the display screen, in a defined manner associated with the display of the UGUI item, a desired GUI item. In response to said identifying this desired GUI item, the displayed UGUI item is visually transformed on the display screen to said desired GUI item. The UGUI item may be a UGUI element or a UGUI relation for indicating the relation between two GUI elements.

20 Claims, 5 Drawing Sheets

(56) References Cited

OTHER PUBLICATIONS

Amit Sheth, "Realizing the Relationship Web: Morphing Information Access on the Web from Today's Document- and Entity-Centric Paradigm to a Relationship-Centric Paradigm", International Workshop on the Many Faces of Multimedia Semantics—An ACM Workshop; www.kettering.edu; p. 1.

J. Gomes, et al., "A System's Architecture for Warping and Morphing of Graphicalobjects", IEEE Xplore 2.0; www.ieeexplore.ieee.org; p. 1.

* cited by examiner

GENERATING UNIVERSAL GRAPHICAL USER INTERFACE ELEMENT AND RELATION

BACKGROUND OF THE INVENTION

Field of the Invention

This invention generally relates to graphical user interfaces (GUIs) for computer programs, and more specifically, the invention relates to methods and systems for generating a GU element or icon. Even more specifically, the preferred embodiment of the invention relates to methods and systems for generating a specific GUI element or relation from a universal GUI element or relation.

SUMMARY OF THE INVENTION

Computer programs can be sophisticated and complex. In order to make these programs easier to learn and to use, they can be provided with user-friendly display interfaces. The user-friendly paradigm can aim to present information in a simple and intuitive fashion. This can be achieved by organizing information using a series of hierarchical menus or windows. Also, user-friendliness can be promoted by including graphical metaphors in the user interface instead of non-descriptive command-line prompts. For example, images of file folders can be used to identify containers for storage of information, and graphical depictions of trash containers can be employed to assist in the disposal (e.g., deletion) of information.

Graphical user interfaces can enable users to interact with computer programs in an intuitive manner utilizing various types of graphical user interface elements or icons. Graphical icons used on display screens in computer systems can represent physical objects in the system, such as storage media and servers, as well as electronic files that pertain to documents and computer applications selected by a user. The icons can present a simple graphical metaphor to users that provide a basic description and/or function of the content of the object represented by the icon. Besides providing access to computer applications and documents, icons can be manually manipulated by a user to perform tasks. For example, an icon representing a text document can be selected by a mouse that is manipulated by a user, and be either placed onto another icon representing a word processing application or placed onto an icon of a printer that represents a printing application. Once placed on the printer icon or word processor icon, the document can be printed or opened by the word processor, respectively.

GUI elements or icons can also be utilized in graphical modeling tools. Graphical molding tools can facilitate the orderly and efficient construction of graphical models. Graphical models can include the visual representation of a collection of interrelated objects. Graphical models can be utilized in different ways by a wide variety of domains. For instance, workflows, organization charts, electrical circuits, software architectures, and software flowcharts, can each be represented utilizing graphical modes. There may be literally thousands of different applications in which graphical modeling tools may be useful. In each case, the types of objects and interrelationships may be quite different. Even within a single domain of application, there may be definite preferences on how the objects and interrelationships are displayed. For instance, one bank may prefer one graphical modeling style for representing economic transactions, while another bank may represent a different graphical modeling style for economic transactions.

Building graphical modeling tools is a challenging and time-consuming task. The building of a typical graphical configuration may involve a software developer implementing a design surface that implements the graphical notation, a toolbox that allows the user to drag and drop elements onto the design surface, a mechanism for representing properties of the objects on the design surface—the properties representing meaningful information about the problem the user is trying to model, and the other User Interface (UI) elements to navigate through the model data.

A broad variety of modeling tools exists, usually each one for targeting one or more specific problem domains. Examples of problem domains include relational database, software development, etc. Such modeling tools can enable a user to manipulate concepts related to their problem domain in ways that aid in analysis and provide a level of automation in gathering and exploiting their model data. A set of model data, for example, can include the data components such as objects and properties that make up the model.

These modeling tools can have a large number of displayable GUI elements, collectively referred to as a toolbox or rich palette set. In tools with complex interfaces involving a rich palette set, it can be difficult and time consuming for the user to find the specific element that he or she wishes to create on a diagramming surface. A solution to this problem is to let the user customize the contents of such palettes. However, when the user needs to change an element, the user is back in the same state, i.e., searching for what he or she wanted. In addition, if the user's requirements span more than a handful of elements, then this approach is not very effective.

An aspect of this disclosure is to improve Graphical User Interfaces.

Another aspect of this disclosure is to make GUIs easier to utilize by adding a Universal GUI Element or a Universal GUI relation to the interface.

A further aspect of this disclosure is to eliminate the need for a user to search for what she or he needs in a multitude of palettes of a Graphical User Interface.

These and other aspects can be addressed with a method, system and article of manufacture for creating a graphical user interface (GUI) item, in a computer system having a graphical user interface and a display screen. In at least some embodiments, the method includes the step of enabling a user to create one or more instances of a defined GUI item. This enabling step, in turn, includes the steps of displaying on the display screen a Universal Graphical User Interface (UGUI) item; and identifying on the display screen, in a defined manner associated with the display of the UGUI item, a desired GUI item. In response to this identifying of the desired GUI item, the displayed UGUI item is visually transformed on the display screen to said desired GUI item.

In at least some embodiments of this disclosure, a defined area on the display screen is associated with the displayed UGUI item, and the identifying step includes the step of identifying said specific GUI item in said defined area. For example, this defined area may be inside the display of the UGUI item. The UGUI item may be a UGUI element or a UGUI relation for indicating the relation between two GUI elements.

At least some embodiments of this disclosure, described in detail below, add a "Universal GUI Element" and a "Universal GUI Relation" to the top level of any palette or any convenient location such as a menu option or action button etc., and then lets the user create elements on the diagramming surface, and names them according to the metamodel element that the user wishes to create. As soon as the UGE is named according to any other element in the palette, it morphs to that element. The same goes for the UGR as well. Content assist can be provided to the user in selecting the proper metamodel element faster. This way, the user no longer needs to search for what he or she needs in a multitude of palettes. Once the user has decided on which element he or she wants to create, creating involves a simple drag-drop and naming instead of an elaborate search through the palette.

Thus, at least some embodiments of this disclosure are directed to a method of creating a graphical user interface (GUI) item, in a computer system having a graphical user interface and a display screen, the method including: enabling a user to create one or more instances of a defined GUI item; displaying on the display screen a Universal Graphical User Interface (UGUI) item; identifying on the display screen, in a defined manner associated with the display of the UGUI item, a desired GUI item; and in response to the identifying, visually transforming the displayed UGUI item on the display screen to the desired GUI item. In at least some embodiments, a defined area on the display screen is associated with the displayed UGUI item; and the identifying being identifying the desired GUI item in the defined area. In at least some embodiments, the defined area is inside the display of the UGUI item. In at least some embodiments, the displaying including the user causing the display of the UGUI item on the display screen. In at least some embodiments, the identifying step includes the user identifying the desired GUI item on the display screen. In at least some embodiments, the transforming including the UGUI item morphing into said desired GUI item. In at least some embodiments, the graphical user interface has a given set of items, and the desired GUI item is one of the given set of items. In at least some embodiments, the displaying includes displaying on the display screen content to help the user identify the desired GUI item. In at least some embodiments, the UGUI item is a UGUI element. In at least some embodiments, the UGUI item is a UGUI relation for indicating a relationship between two GUI elements.

Also, in at least some embodiments, this disclosure is directed to a computer system, including: a display screen; and a graphical user interface (GUI) for displaying GUI items on the display screen, and for enabling a user to create one or more instances of a defined GUI item by: displaying on the display screen a Universal Graphical User Interface (UGUI) item, identifying on the display screen, in a defined manner associated with the display of the UGUI item, a desired GUI item, and in response to the identifying, visually transforming the displayed UGUI item on the display screen to the desired GUI item. In at least some embodiments, a defined area on the display screen is associated with the displayed UGUI item; and the identifying is done by identifying the specific GUI item in the defined area. In at least some embodiments, the user causes the display of the UGUI item on the display screen, and the user identifies the desired GUI item on the display screen. In at least some embodiments, a transforming is done by the UGUI item morphing into the desired GUI item. In at least some aspects, the UGUI item is at least one of a UGUI element and a UGUI relation for indicating a relationship between two GUI elements.

At least some embodiments of this disclosure are directed to an article of manufacture including: at least one computer usable medium having computer readable program code logic to execute a machine instruction in a processing unit for creating a graphical user interface (GUI) item, in a computer system having a graphical user interface and a display screen, the computer readable program code logic executing the following: enabling a user to create one or more instances of a defined GUI item, including the steps of: displaying on the display screen a Universal Graphical User Interface (UGUI) item; identifying on the display screen, in a defined manner associated with the display of the UGUI item, a desired GUI item; and in response to the identifying, visually transforming the displayed UGUI item on the display screen to the desired GUI item. In at least some embodiments, a defined area on the display screen is associated with the displayed UGUI item; and the identifying step including identifying the specific GUI item in the defined area. In at least some embodiments, the defined area is inside the display of the UGUI item. In at least some embodiments, the transforming step includes the step of the UGUI item morphing into the desired GUI item. In at least some embodiments, the graphical user interface has a given set of items, and the desired GUI item is one of the given set of items.

Benefits and advantages of this invention will become apparent from a consideration of the following detailed description, given with reference to the accompanying drawings, which specify and show exemplary embodiments of the invention.

DETAILED DESCRIPTION OF THE PREFERRED EMBODIMENTS

Figure 1:
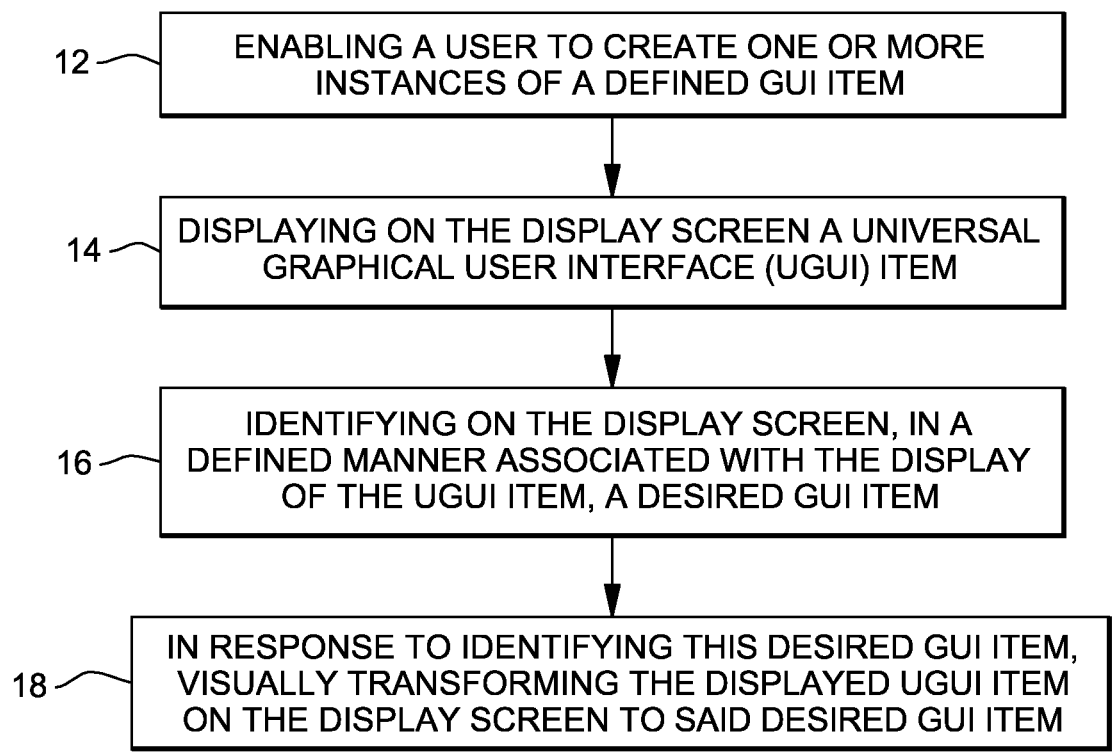
FIG. 1 illustrates a procedure that can be utilized to implement at least some aspects and embodiments of this invention.

The present invention, generally, provides a method, system and article of manufacture for creating a graphical user interface (GUI) item, in a computer system having a graphical user interface and a display screen. With reference to FIG. 1, in at least one embodiment of the invention, the method includes a step (or combination of steps) 12 of enabling a user to create one or more instances of a defined GUI item. This enabling step (or steps), in turn, includes the step (or combination of steps) 14 of displaying on the display screen a Universal Graphical User Interface (UGUI) item; and the step (or combination of steps) 16 of identifying on the display screen, in a defined manner associated with the display of the UGUI item, a desired GUI item. In response to said identifying this desired GUI item, the displayed UGUI item, at step (or steps) 18, is visually transformed on the display screen to said desired GUI item.

In an exemplary embodiment, a defined area on the display screen is associated with the displayed UGUI item, and the identifying step includes the step of identifying said specific GUI item in said defined area. For example, this defined area can be inside the display of the UGUI item. The UGUI item may be a UGUI element or a UGUI relation for indicating the relation between two GUI elements.

In an exemplary embodiment of the invention, a "Universal GUI Element" and a "Universal GUI Relation" are included at the top level of any palette or any convenient location such as a menu option or action button etc., and then the user creates elements on the diagramming surface, and names them according to the metamodel element that he or she wishes to create. As soon as the UGE is named according to any other element in the palette, it morphs to that element. The same also applies for the UGR. Content assist can be provided to the user in selecting the proper metamodel element faster. This way, the user no longer needs to search for what he or she needs in a multitude of palettes. Once the user has decided on which element the user wants to create, creating involves a simple drag-drop and naming instead of an elaborate search through the palette.

Figure 2:
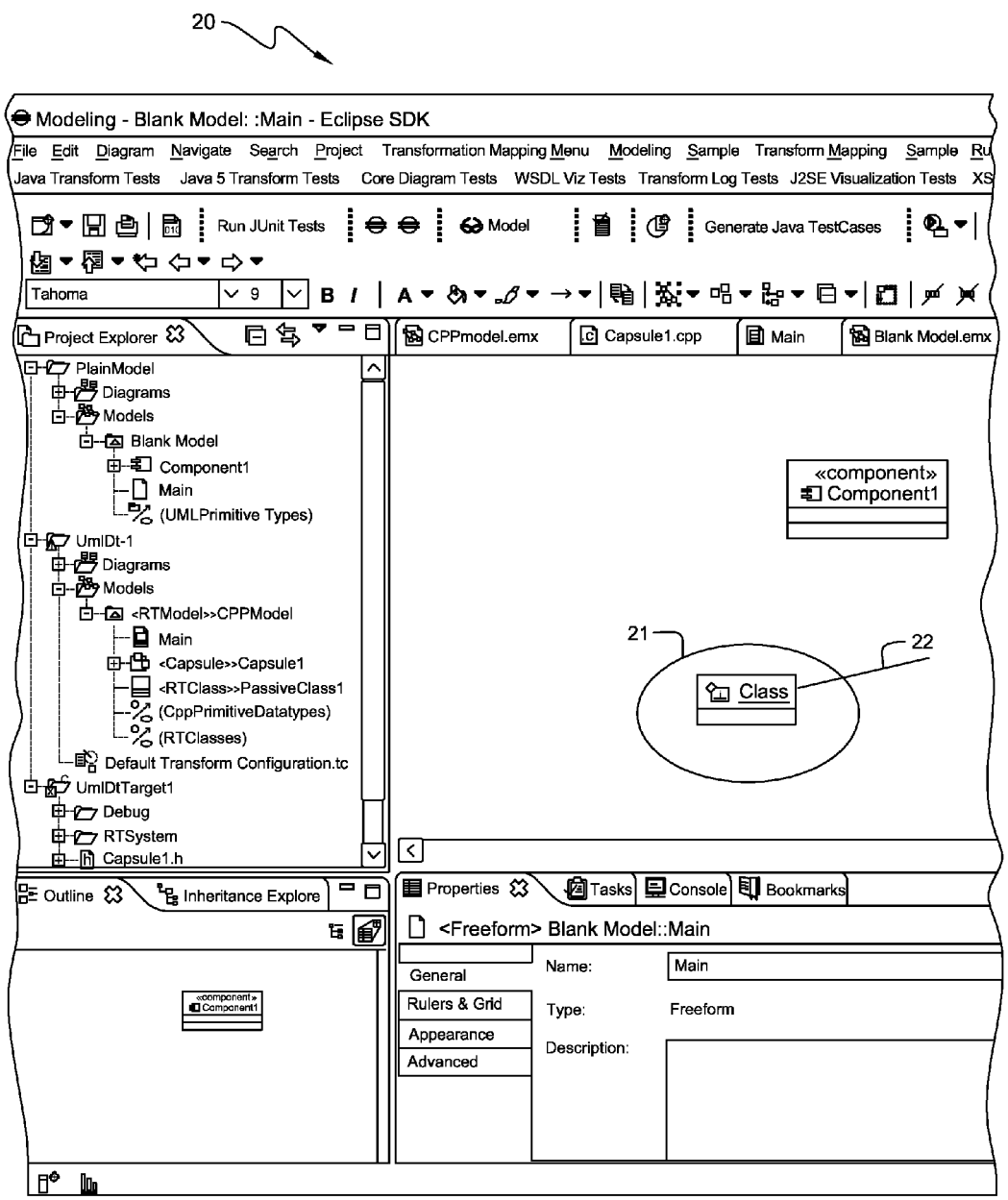
FIG. 2 shows a first display screen that may be shown in accordance with at least some aspects and embodiments of the invention.

More specifically, with reference to the display screen 20 shown in FIG. 2, an exemplary embodiment of the invention provides an enhancement to the existing palette for modeling tools like RSA with a box 21 called the "Universal GUI Element" and an arrow 22 called the "Universal GUI Relation." These two elements come up at the top level of the main palette menu. The user can drag the box or the arrow onto the diagramming surface and then, depending on what the user types in that box, the box/arrow is transformed by morphing to the corresponding UML element.

Figure 3:
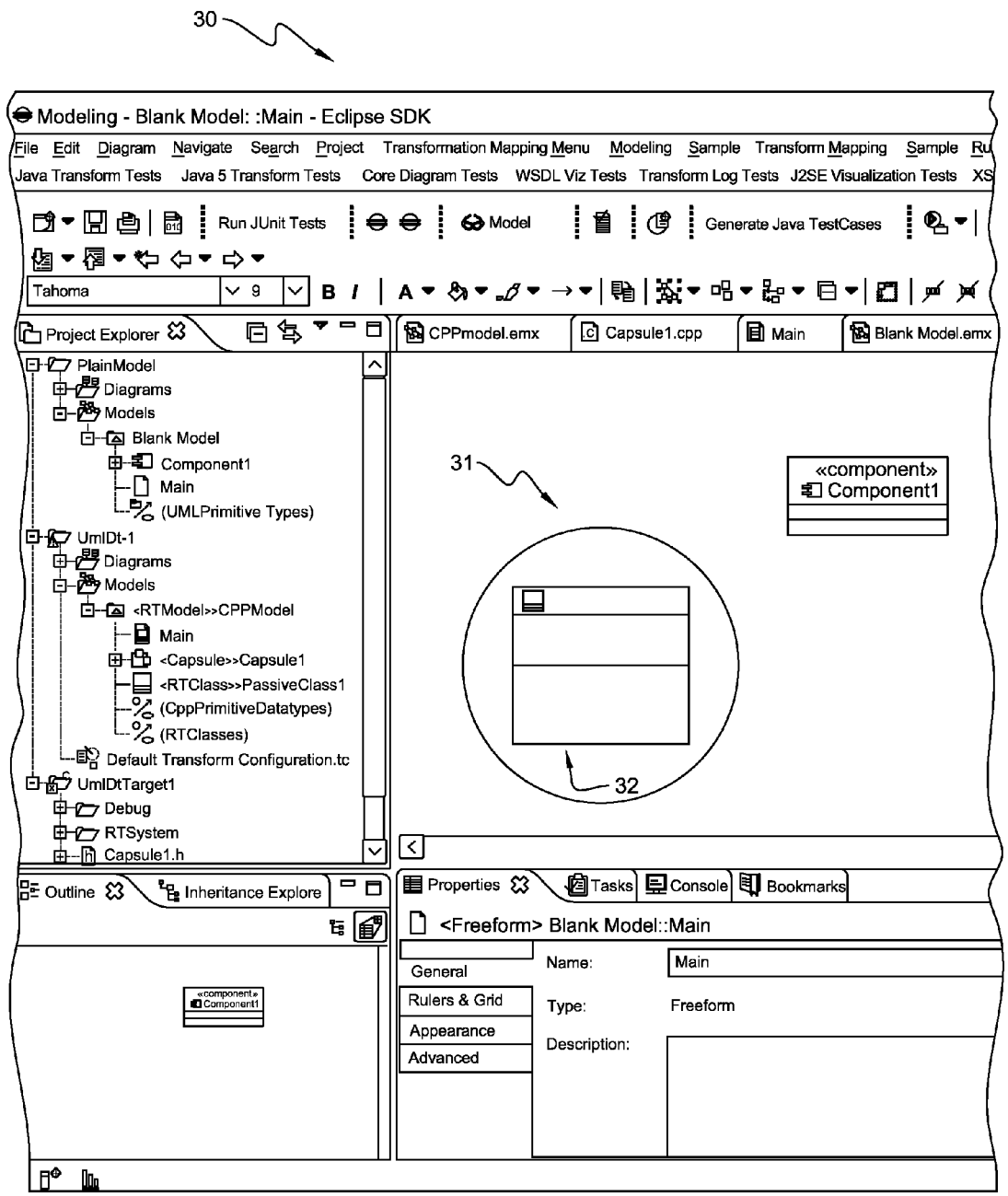
FIG. 3 depicts a second display screen that may be shown in accordance with at least some aspects and embodiments of this invention.

As illustrated with reference to the display screen 30 in FIG. 3, the UGE 31 can have a free flowing text field 32 inside it, where the user can type the name of the UML element that he or she wants the UGE to morph into. The metamodel element representing the user intention is instantiated by the tool and is created on the diagramming surface. The effect of morphing can be achieved by deleting the placeholder element that is initially created when the user drags the UGE, and then creating an instance of the user defined type. The details of the transformation can be transparent to the user, so the effect is as if the element has morphed into the new type. Once the user enters the keyword class (or any of the other UML element types—Component, Capsule, State etc), the UGE box morphs into the corresponding UML element as explained above.

The same general procedure can also hold for relationships. The user can connect two elements via the Universal GUI Relation and then name the relationship "Generalization," "Realization," "Dependency," etc., and the Universal GUI Relation will morph into the named relationship.

These procedures make complex modeling tools much more usable and customer-friendly—the user does not have to spend time deciding on which menu to pull down, to find a UML element or relationship.

Figure 4:
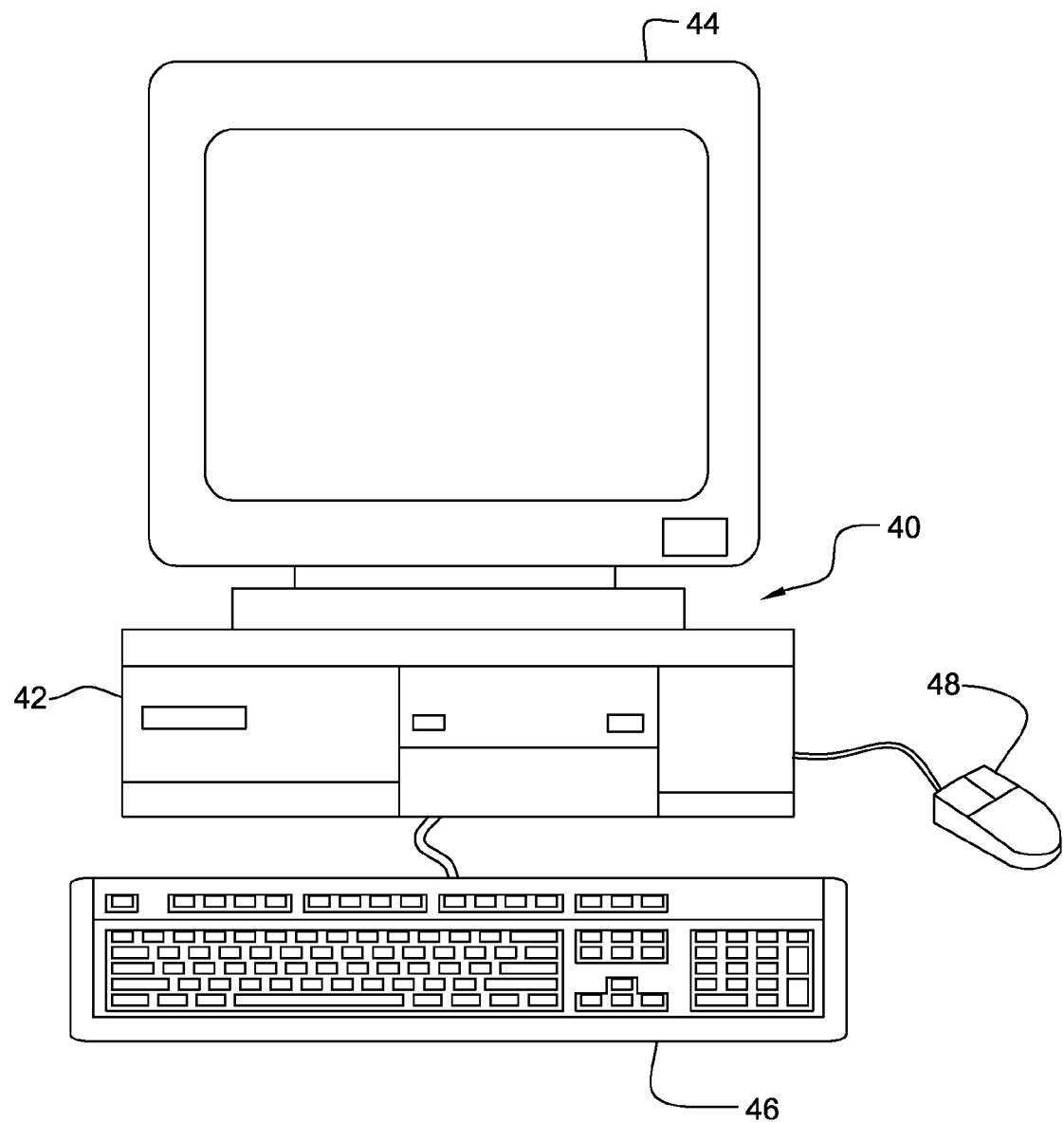
FIG. 4 is a pictorial representation of a data processing system in which at least some aspects and embodiments of the present invention can be implemented.

FIG. 4 depicts a pictorial representation of a data-processing system in which the present invention may be implemented. A personal computer 40 is depicted that includes a system unit 42, a video display terminal 44, an alphanumeric input device (i.e., keyboard 46) having alphanumeric and other keys, and a mouse 48. An additional input device (not shown), such as a trackball or stylus, also can be included with personal computer 40. Computer 40 can also include a graphical user interface that resides within a machine-readable media to direct the operation of computer 40.

Although the depicted embodiment involves a personal computer, an exemplary embodiment of the present invention can be implemented in other types of data-processing systems, such as, for example, intelligent workstations or minicomputers. Computer 40 can be implemented utilizing any suitable computer, such as an IBM Aptiva computer, a product of International Business Machines Corporation, located in Armonk, N.Y. "Aptiva" is a registered trademark of International Business Machines Corporation.

At least some embodiments of the method of the present invention can be implemented by a computer executing a sequence of program instructions for carrying out the steps of the method and can be embodied in a computer program product comprising media storing the program instructions. For example, FIG. 5 and the following discussion provide a brief general description of a suitable computing environment in which the invention can be implemented. It should be understood, however, that handheld, portable, and other computing devices of all kinds are contemplated for utilization in connection with embodiments of the present invention. While an exemploary embodiment with a general-purpose computer is described below, at least some embodiments of the present invention can be implemented in an environment of networked hosted services in which very little or minimal client resources are implicated, e.g., a networked environment in which the client device serves merely as a browser or interface to the World Wide Web.

Although not required in all embodiments, the invention can be implemented via an application-programming interface (API), for utilization by a developer, and/or included within the network browsing software, which will be described in the general context of computer-executable instructions, such as program modules, being executed by one or more computers, such as client workstations, servers, or other devices. Program modules can include routines, programs, objects, components, data structures and the like that perform particular tasks or implement particular abstract data types. The functionality of the program modules can be combined or distributed as desired in various embodiments. Moreover, those skilled in the art will appreciate that at least some embodiments of the invention can be practiced with other computer system configurations.

Other well known computing systems, environments, and/or configurations that can be suitable for use with at least some embodiments of the invention include, but are not limited to, personal computers (PCs), server computers, handheld or laptop devices, multi-processor systems, microprocessor-based systems, programmable consumer electronics, network PCs, minicomputers, mainframe computers, and the like. At least some embodiments of the invention can also be practiced in distributed computing environments where tasks are performed by remote processing devices that are linked through a communications network or other data transmission medium. In a distributed computing environment, program modules can be located in both local and remote computer storage media including memory storage devices.

Figure 5:
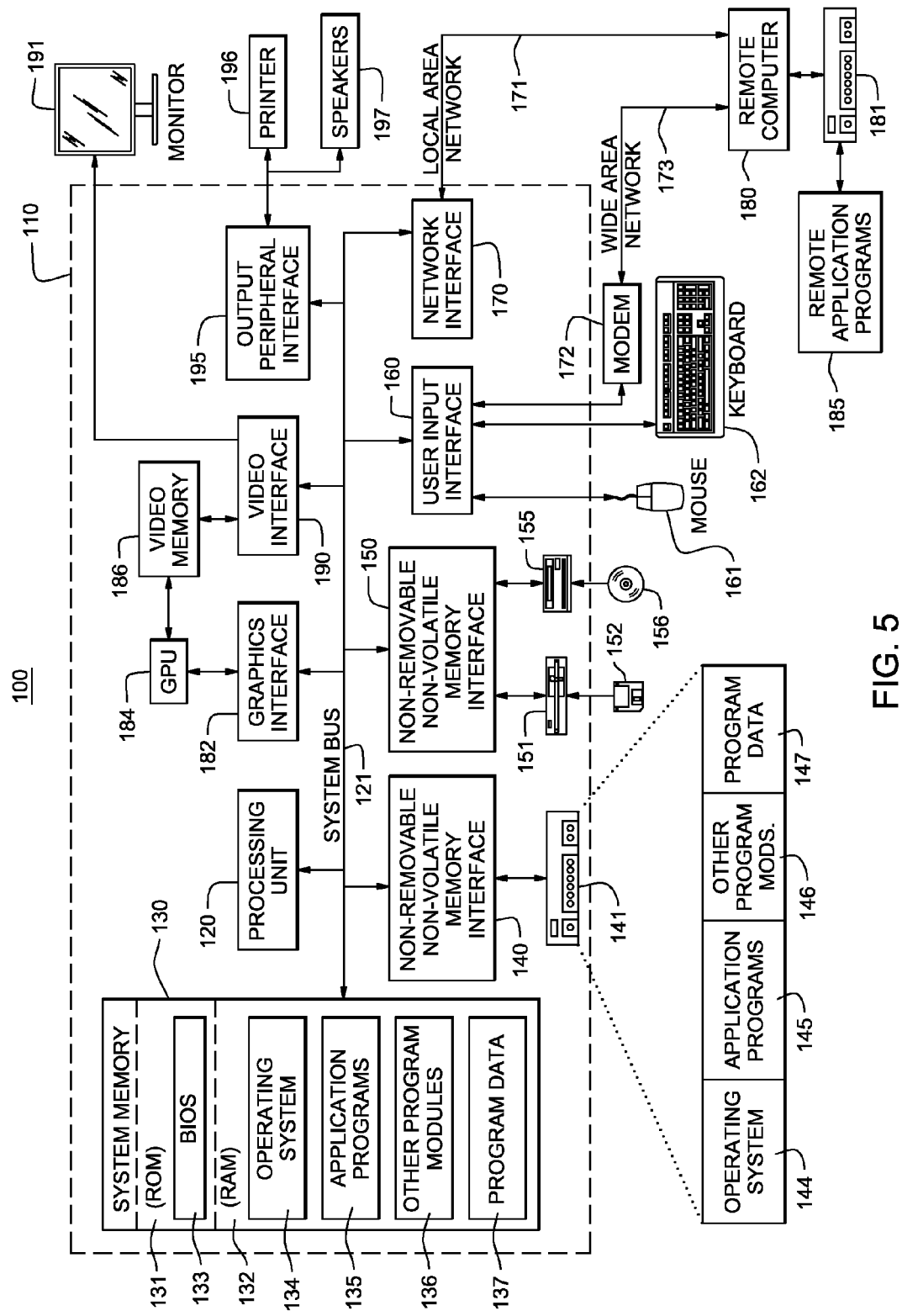
FIG. 5 is a block diagram illustrating components of a data processing system that can be utilized to carry out at least some aspects and embodiments of this invention.

FIG. 5, thus, illustrates an example of a suitable computing system environment 100 in which the invention can be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 5, an exemplary system for implementing the invention includes a general purpose-computing device in the form of a computer 110. Components of computer 110 can include, but are not limited to, a processing unit 120, a system memory 130, and a system bus 121 that couples various system components including the system memory to the processing unit 120. The system bus 121 can be any of several types of bus structures including a memory bus or memory controller, a peripheral bus, and a local bus utilizing any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 can include a variety of computer readable media. Computer readable media can be any available media that can be accessed by computer 110 and includes both volatile and nonvolatile media, removable and non-removable media. By way of example, and not limitation, computer readable media can include computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium that can be utilized to store the desired information and that can be accessed by computer 110.

Communication media can embody computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, can be stored in ROM 131. RAM 132 can contain data and/or program modules that are immediately accessible to and/or presently being operated on by processing unit 120. By way of example, and not limitation, FIG. 5 illustrates operating system 134, application programs 135, other program modules 136, and program data 137.

The computer 110 can also include other removable/non-removable, volatile/nonvolatile computer storage media. By way of example only, FIG. 5 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be utilized in the exemplary operating environment include, but are not limited to, magnetic tape cassettes, flash memory cards, digital versatile disks, digital video tape, solid state RAM, solid state ROM, and the like. The hard disk drive 141 can be connected to the system bus 121 through a non-removable memory interface such as interface 140, and magnetic disk drive 151 and optical disk drive 155 can be connected to the system bus 121 by a removable memory interface, such as interface 150.

The drives and their associated computer storage media discussed above and illustrated in FIG. 5 provide storage of computer readable instructions, data structures, program modules and other data for the computer 110. In FIG. 5, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they can be different copies.

A user can enter commands and information into the computer 110 through input devices such as a keyboard 162 and pointing device 161, commonly referred to and embodied as a mouse, trackball or touch pad. Other input devices (not shown) can include a microphone, joystick, game pad, satellite dish, scanner, or the like. These and other input devices can be connected to the processing unit 120 through a user input interface 160 that is coupled to the system bus 121, but can be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, can also be connected to the system bus 121. Northbridge is a chipset that communicates with the CPU, or host-processing unit 120, and assumes responsibility for accelerated graphics port (AGP) communications. One or more graphics processing units (GPUs) 184 can communicate with graphics interface 182. In this regard, GPUs 184 can include on-chip memory storage, such as register storage and GPUs 184 communicate with a video memory 186. GPUs 184, however, are but one example of a coprocessor and thus a variety of co-processing devices can be included in computer 110. The monitor 191 or other type of display device that is also connected to the system bus 121 via an interface, such as a video interface 190, can in turn communicate with video memory 186. In addition to monitor 191, computers can also include other peripheral output devices such as speakers 197 and printer 196, that can be connected through an output peripheral interface 195.

The computer 110 can operate in a networked environment utilizing logical connections to one or more remote computers, such as a remote computer 180. The remote computer 180 can be a personal computer, a server, a router, a network PC, a peer device or other common network node, and can include many or all of the elements described above relative to the computer 110, although only a memory storage device 181 has been illustrated in FIG. 5. The logical connections depicted in FIG. 5 include a local area network (LAN) 171 and a wide area network (WAN) 173, but can also include other networks. Such networking environments can be utilized, for example, in offices, enterprise-wide computer networks, intranets and the Internet.

When utilized in a LAN networking environment, the computer 110 is connected to the LAN 171 through a network interface or adapter 170. When utilized in a WAN networking environment, the computer 110 can include a modem 172 or other means and/or apparatus for establishing communications over the WAN 173, such as the Internet. The modem 172, which can be internal or external, can be connected to the system bus 121 via the user input interface 160, or other appropriate mechanism. In a networked environment, program modules depicted relative to the computer 110, or portions thereof, can be stored in the remote memory storage device. By way of example, and not limitation, FIG. 5 illustrates remote application programs 185 as residing on memory device 181. It will be appreciated that the network connections shown are exemplary and other means of and apparatus for establishing a communications link between the computers can be used One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

As will be readily apparent to those skilled in the art, at least some aspects of the present invention can be realized in hardware, software, or a combination of hardware and software. Any kind of computer/server system(s)—or other apparatus adapted for carrying out the methods described herein—is suited. A typical combination of hardware and software could be a general-purpose computer system with a computer program that, when loaded and executed, carries out the respective methods described herein. Alternatively, a specific use computer, containing specialized hardware for carrying out one or more of the functional tasks of the invention, could be utilized.

The present invention, or aspects of the invention, can also be embodied in a computer program product, which can include all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled n the art, and it is intended that the appended claims cover all such modifications and embodiments as fall within the true spirit and scope of the present invention.

What is claimed is:

1. A method of creating a graphical user interface (GUI) item, in a computer system having a graphical user interface and a display screen, the method comprising:
enabling a user to create one or more instances of a defined GUI item;
displaying on the display screen a Universal Graphical User Interface (UGUI) item;
identifying on the display screen, in a defined manner associated with the display of the UGUI item, a desired GUI item; and
in response to said identifying, visually transforming said displayed UGUI item on the display screen to said desired GUI item.

2. The method of claim 1, wherein:
a defined area on the display screen is associated with the displayed UGUI item; and
said identifying comprising identifying said desired GUI item in said defined area.

3. The method of claim 2, wherein
said defined area is inside the display of the UGUI item.

4. The method of claim 1, wherein
said displaying comprising the user causing the display of the UGUI item on the display screen.

5. The method of claim 1, wherein
the identifying comprising the user identifying the desired GUI item on the display screen.

6. The method of claim 1, wherein
the transforming comprising morphing the UGUI item into said desired GUI item.

7. The method of claim 1, wherein
the graphical user interface has a given set of items, and the desired GUI item is one of said given set of items.

8. The method of claim 1, wherein
the displaying comprising displaying on the display screen content to help the user identify the desired GUI item.

9. The method of claim 1, wherein
the UGUI item is a UGUI element.

10. The method of claim 1, wherein
the UGUI item is a UGUI relation for indicating a relationship between two GUI elements.

11. A computer system, comprising:
a display screen; and
a graphical user interface (GUI) for displaying GUI items on the display screen, and for enabling a user to create one or more instances of a defined GUI item by:
displaying on the display screen a Universal Graphical User Interface (UGUI) item, identifying on the display screen, in a defined manner associated with the display of the UGUI item, a desired GUI item, and
in response to said identifying, visually transforming said displayed UGUI item on the display screen to said desired GUI item.

12. The computer system of claim 11, wherein:
a defined area on the display screen is associated with the displayed UGUI item; and
the identifying is done by identifying said specific GUI item in said defined area.

13. The computer system of claim 11, wherein
the user causes the display of the UGUI item on the display screen, and
the user identifies the desired GUI item on the display screen.

14. The computer system of claim 11, wherein
the transforming is done by the UGUI item morphing into said desired GUI item.

15. The computer system of claim 11, wherein
the UGUI item is at least one of a UGUI element and a UGUI relation for indicating a relationship between two GUI elements.

16. A computer program product comprising a computer usable storage medium having stored therein computer usable program code for creating a graphical user interface (GUI) item in a computer hardware system having a graphical user interface and a display screen, said computer usable program code, which when executed by the computer hardware system, causes the computer hardware system to perform:
displaying on the display screen a Universal Graphical User Interface (UGUI) item;
identifying on the display screen, in a defined manner associated with the display of the UGUI item, a desired GUI item; and in response to said identifying, visually transforming said displayed UGUI item on the display screen to said desired GUI item.

17. The computer program product of claim 16, wherein:

a defined area on the display screen is associated with the displayed UGUI item; and the identifying step comprising identifying said specific GUI item in said defined area.

18. The computer program product of claim 17, wherein said defined area is inside the display of the UGUI item.

19. The computer program product of claim 16, wherein the transforming includes morphing the UGUI item into said desired GUI item.

20. The computer program product of claim 16, wherein the graphical user interface has a given set of items, and the desired GUI item is one of said given set of items.

* * * * *